United States Patent [19]

Douglas et al.

[11] Patent Number: 5,448,695
[45] Date of Patent: Sep. 5, 1995

[54] METHOD AND APPARATUS FOR DYNAMIC VISUAL FEEDBACK MESSAGING IN A GRAPHICAL USER INTERFACE OF A DATA PROCESSING SYSTEM

[75] Inventors: Thomas B. Douglas, Dallas; Robert J. Torres, Colleyville, both of Tex.

[73] Assignee: International Business Machines Corporation, Armonk, N.Y.

[21] Appl. No.: 999,237

[22] Filed: Dec. 31, 1992

[51] Int. Cl.⁶ .................................................. G06F 3/14
[52] U.S. Cl. ..................................... 395/155; 395/157; 395/159; 395/161
[58] Field of Search ............... 395/157, 155, 158, 159, 395/161, 550

[56] References Cited
PUBLICATIONS

Microsoft Windows User's Guide (Microsoft Corporation) pp. 6, 35, 126–128, 117, 136.
Microsoft Windows User's Guide (Trademark of Microsoft Corporation), 1990, pp. 17, 41–42, 139 & 199 and attached sheets #1, 2, 3,.

*Primary Examiner*—Heather R. Herndon
*Assistant Examiner*—Cliff Vo
*Attorney, Agent, or Firm*—Jonathan E. Jobe; Melvin A. Hunn; Andrew J. Dillon

[57] ABSTRACT

A method and apparatus is provided for visually representing data processing operations in a data processing system. An action feedback message is provided for a particular data processing operation. It includes a non-textual message component. Communication between an operator and the data processing system is monitored for requests for performance of the particular data processing operation. For each time a particular data processing operation is performed by the data processing system, the action feedback message is automatically displayed on a display of the data processing system, preferably for a predetermined time interval during the performance of the particular data processing operation. The action feedback message may be moved along a predetermined display path on the display of the data processing system during automatic display. Preferably the action feedback message and/or the predetermined display path is located in a region of the display of likely operator focus, as determined from automatic monitoring of operator input to the data processing system. If it is impossible to determine the region of likely operator focus, the display of the action feedback message is delayed until such determination can be made. Additionally, an operation completion message, which includes a non-textual graphical message component, and which differs from the action feedback message, is provided for display upon completion of the particular data processing operation. If operator input activities indicate that the operator is not likely to be focused on the display screen, the operation completion messages are queued for display at a later time, preferably a time during which operator input indicates that the operator is focused on the display screen of the data processing system.

28 Claims, 12 Drawing Sheets

METHOD AND APPARATUS FOR DYNAMIC VISUAL FEEDBACK MESSAGING IN A GRAPHICAL USER INTERFACE OF A DATA PROCESSING SYSTEM

BACKGROUND OF THE INVENTION

1. Technical Field

The present invention relates in general to graphical user interfaces for data processing systems, and in particular to techniques for improving the display of information relating to data processing operations in a graphical user interface of a data processing system.

2. Description of the Related Art

In recent years, the data processing industry has made a substantial move away from keyboard-driven user interfaces toward graphical user interfaces. A variety of menus and operator buttons are provided in most graphical user interface systems. Simultaneously, the industry has moved toward the use of multiple workspaces, or "windows", in order to facilitate multi-tasking activities, and to otherwise allow the coordinated utilization of data processing resources, such as software objects, hardware devices, and application programs. The principal advantages obtained by utilizing both graphical user interfaces and multiple workspace environments are an enhanced operating efficiency, as well as an advantageous utilization of operator intuition insofar as the data processing objects and resources can be handled like real world objects, which facilitates learning and retention of new application programs. Despite these significant advantages, the utilization of graphical user interfaces and/or multiple workspace operating environments tends to overload the inexperienced operator with more information than he or she can handle efficiently and without error. Inexperienced operators frequently have difficulty in developing a functional understanding of the hierarchical relationships which are inherent in the utilization of data processing resources.

In order to maintain their apparently dominant and increasing role in data processing systems, graphical user interfaces will need continuing "streamlining" in order to allow inexperienced users to come to a quick, and preferably intuitive, understanding of the use of data processing resources, and in particular data processing operations which involve particular data processing resources such as software objects and hardware devices. Such improvements should continue the trend in reducing unnecessary or useless user requests which strain data processing resources, such as data processing end devices, in networked and group-work environments. For example, much needs to be done to minimize the opportunity for unnecessary or erroneous uses of end devices, such as printing devices. An inexperienced operator, or an experienced operator performing difficult tasks, may inadvertently print lengthy documents more often than necessary due to temporary memory lapses or confusion. Conventional graphical user interfaces are not effective in providing the operator with information relating to either on-going print operations or previously-completed print operations. Even if information is provided to the operator, conventional graphical user interfaces are deficient in that messages provided to the operator may be provided during brief periods of inattention to the data processing display screen. Operations other than printing are likewise hindered by inefficiencies in providing information to the operator.

SUMMARY OF THE INVENTION

It is one objective of the present invention to provide a method and apparatus for use in a data processing system which provides for the visual representation of data processing operations, wherein an action feedback message, which includes a non-textual graphical message component, is identified to a particular data processing operation and automatically displayed for a predetermined time interval during the performance of the particular data processing operation by the data processing system.

It is another objective of the present invention to provide a method and apparatus for use in a data processing system to visually represent data processing operations, wherein an action feedback message is identified to a particular data processing operation and automatically displayed and moved along a predetermined display path upon detection of an operator request for performance of the particular data processing operation.

It is yet another objective of the present invention to provide a method and apparatus for providing an action feedback message which is identified to a particular data processing operation, which is displayed for a predetermined duration in a location on a display screen which is identified by the data processing system as being the likely operator focal point within the data processing display screen.

It is yet another objective of the present invention to provide an action feedback message which moves across a selected workspace on or about the initiation of a particular data processing operation which is identified with it, as well as an operation completion message which is provided at a selected location upon completion of the particular data processing operation, and which differs from the action feedback message.

It is still another objective of the present invention to provide an action feedback message which moves across a selected workspace on or about the initiation of a particular data processing operation which is identified with it, as well as an operation completion message which is provided at a selected location upon completion of the particular data processing operation, and which differs from the action feedback message, wherein operator interaction with the data processing system is monitored to determine whether the operator is focused on the display screen of the data processing system, and wherein automatic display of the action feedback message is delayed, or suspended, until it can be determined that the operator is attentive to the display, and wherein the operation completion messages are prolonged, or queued, if it is evident that the operator is inattentive to the display screen until it can be determined that the operator's attention has shifted back to the display screen.

These and other objectives are achieved as is now described. When considered broadly as a method, the present invention comprises a method of visually representing data processing operations in a data processing system, and is composed of a number of method steps. An action feedback message is provided for a particular data processing operation. The action feedback message includes a non-textual graphical message component. In the preferred embodiment, the action feedback message includes both a non-textual graphical message component and a textual message component. The data processing system monitors for communication between an operator and the data processing system, and in particular monitors for requests for performance of the particular data processing operation. In the preferred embodiment, detection of the request for the particular data processing operation causes the automatic display of the action feedback message for a predetermined time interval on the display of the data processing system, each time the particular data processing operation is performed by the data processing system. Preferably, while the action feedback message is being displayed on the display, it is automatically moved along a predetermined display path which intersects, or is adjacent to, a region on the display of likely operator focus. The region of likely operator focus is determined empirically by automatic monitoring of communication between the operator and the data processing system.

If it is determined that the operator is not focusing on a particular portion of the display of the data processing system, the step of automatically displaying the action feedback message is delayed until it is possible to determine the region of likely operator focus. Once the region of likely operator focus is identified, the action feedback message is automatically displayed, preferably along the display path which coincides with or adjoins the region of likely operator focus.

A plurality of different action feedback messages may be provided, one for each of a plurality of data processing operations. During detected periods of inattention to the display of the data processing system, the different action feedback messages may be queued in memory in a first-in, first-out manner at least until it is possible to determine the region of likely operator focus.

In the preferred embodiment, at least one graphical user interface button is provided to allow at least one of (a) suspension, and (b) abortion of any particular data processing operation either prior to the initiation of the operation or during execution of the operation. Also, preferably, at least one user interface command is provided which allows the operator to set the predetermined time interval for the automatic display of action feedback messages. For those operators that find the action feedback messages of the present invention to be a distraction, at least one user interface command is provided which allows for the disabling of the automatic display of action feedback messages.

Also, in the preferred embodiment, an operation completion message is provided in addition to the action feedback message. Preferably, the operation completion message includes a non-textual graphical message component and differs from the action feedback message. An operation completion message is identified to each particular data processing operation for which an action feedback message exists. Upon completion of a particular data processing operation, the operation completion message is provided in a selected location, and preferably for a selected duration. If it is determined from monitoring of operator interaction with the data processing system that the operator may be inattentive to activity on the display of the data processing system, the various completion operation messages are queued on a first-in, first-out basis for later display, preferably during a period during which operator activity indicates that the operator's attention is focused on the display of the data processing system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
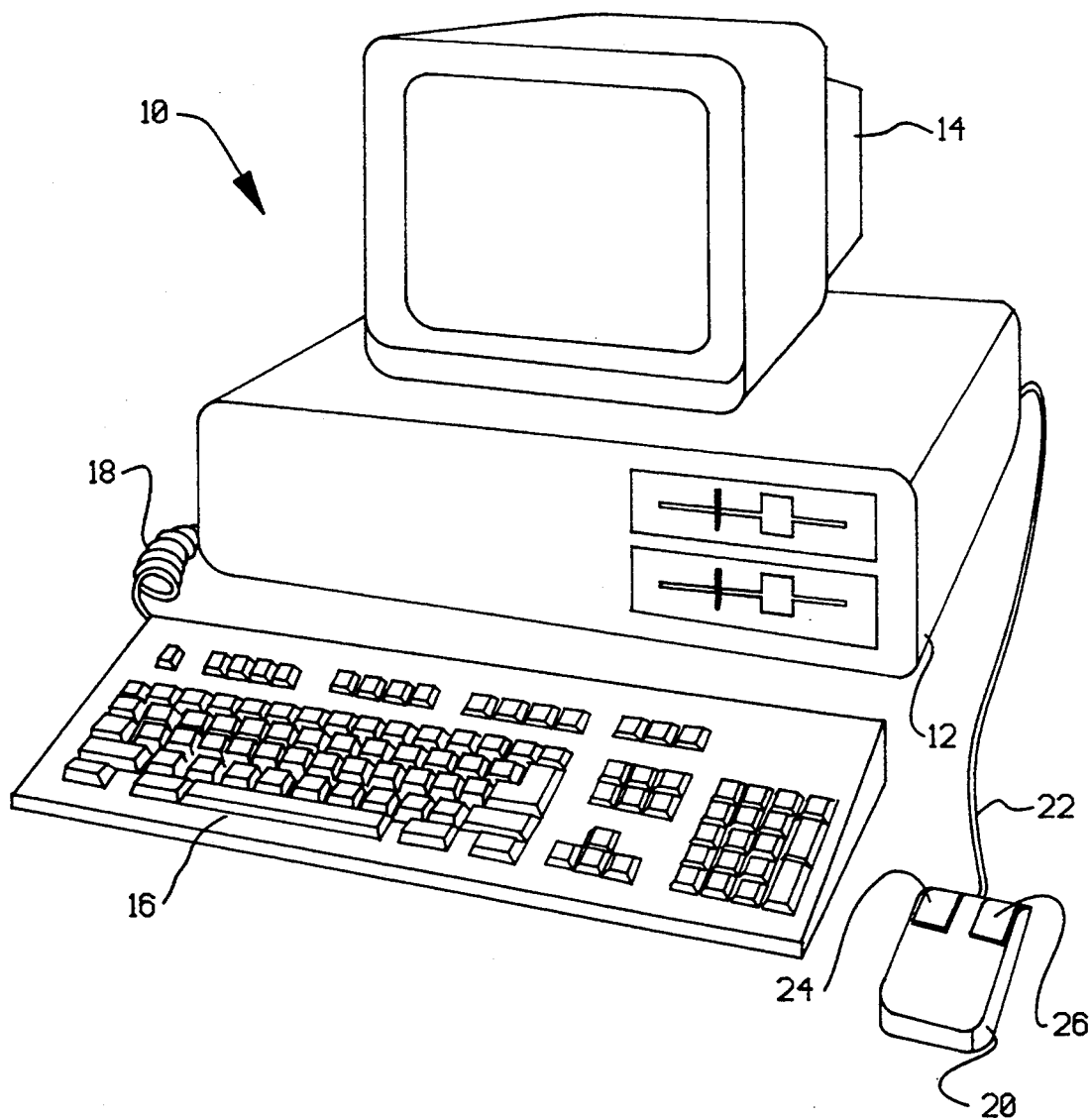
FIG. 1 is a perspective view of a data processing system which can be utilized to implement the method and apparatus of the present invention.

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a so-called personal computer, such as the Model 80 PS/2 computer manufactured by International Business Machines Corporation of Armonk, New York.

In the present invention, two types of messages are provided, including: (1) an action feedback message, and (2) an operation completion message. In accordance with the preferred embodiment of the present invention, particular data processing operations are identified for visual representation in a graphical user interface and/or multiple workspace environment. A unique action feedback message and a unique operation completion message are identified to each particular identified data processing operation. The primary function of the action feedback message is to provide a message which includes some non-textual graphical message components which provides a visual indication of the particular data processing operation; this allows the operator to be visually alerted by a message, which includes non-textual graphical components, that the particular requested data processing operation is about to be, or is being, performed. This action feedback message thus serves two purposes, including: (1) to provide the operator with an opportunity to suspend or abort the activity prior to initiation and/or completion, and (2) to generally orient the operator to the fact that a particular resource-consuming data processing activity has been requested, which inherently may preclude the simultaneous or concurrent performance of data processing operations which include either the software objects or the data processing resources which are involved in the requested data processing operation. The operation completion message serves the predominant function of providing a visual confirmation to the operator that the specific data processing operation has been completed. As will be set forth more clearly herebelow, when the operator appears to be inattentive to the display of the data processing system, the operation completion message provides a visual and chronological record of the completion of selected ones of the particular data processing operations, which will be presented automatically for review when the operator's attention returns to the display of the data processing system.

Figure 2A:
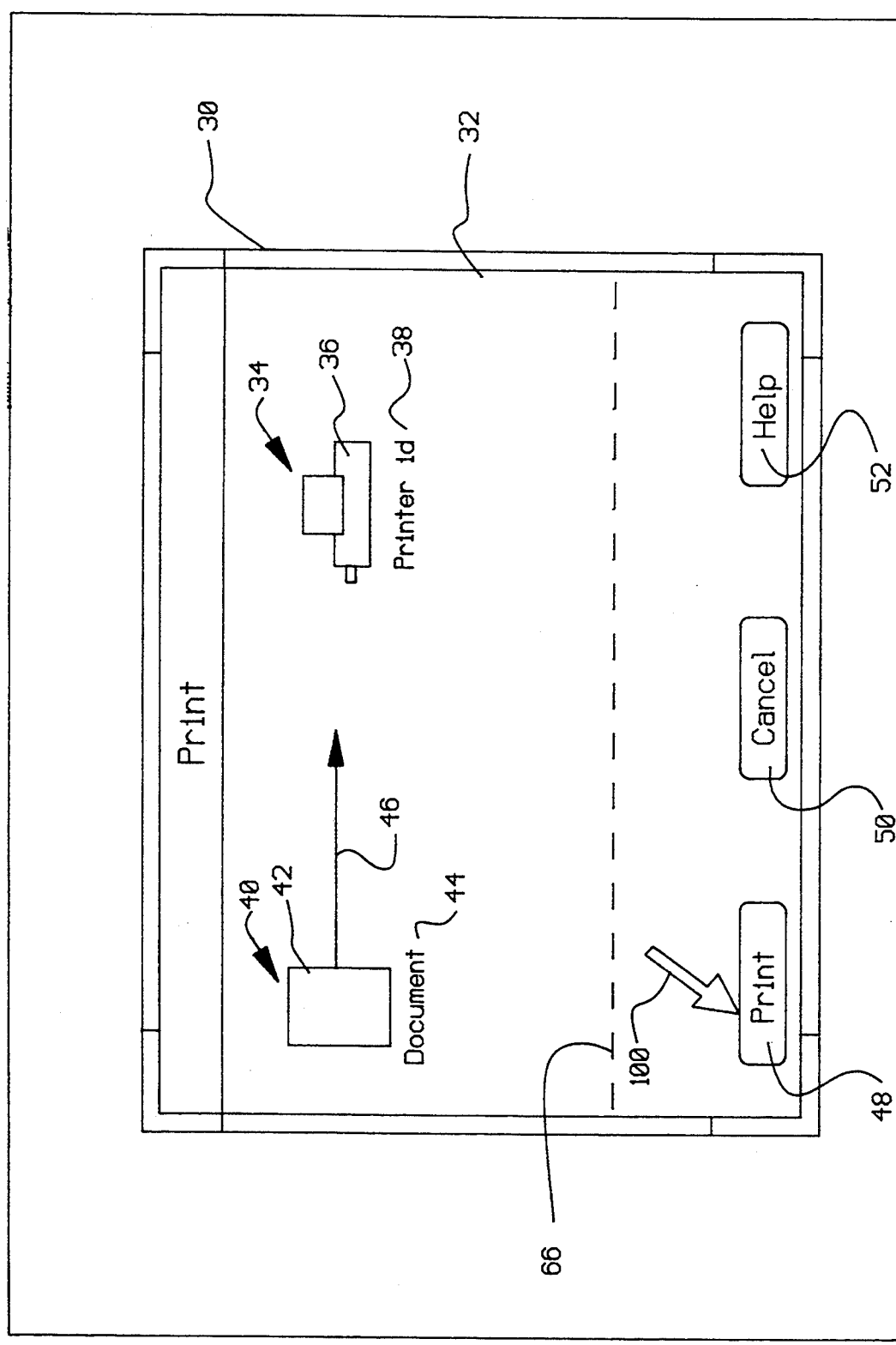
FIGS. 2a, 2b, 2c, 2d, and 2e graphically depict examples of utilization of the method and apparatus of the present invention in providing visual feedback messaging in a graphical user interface.
Figure 2B:
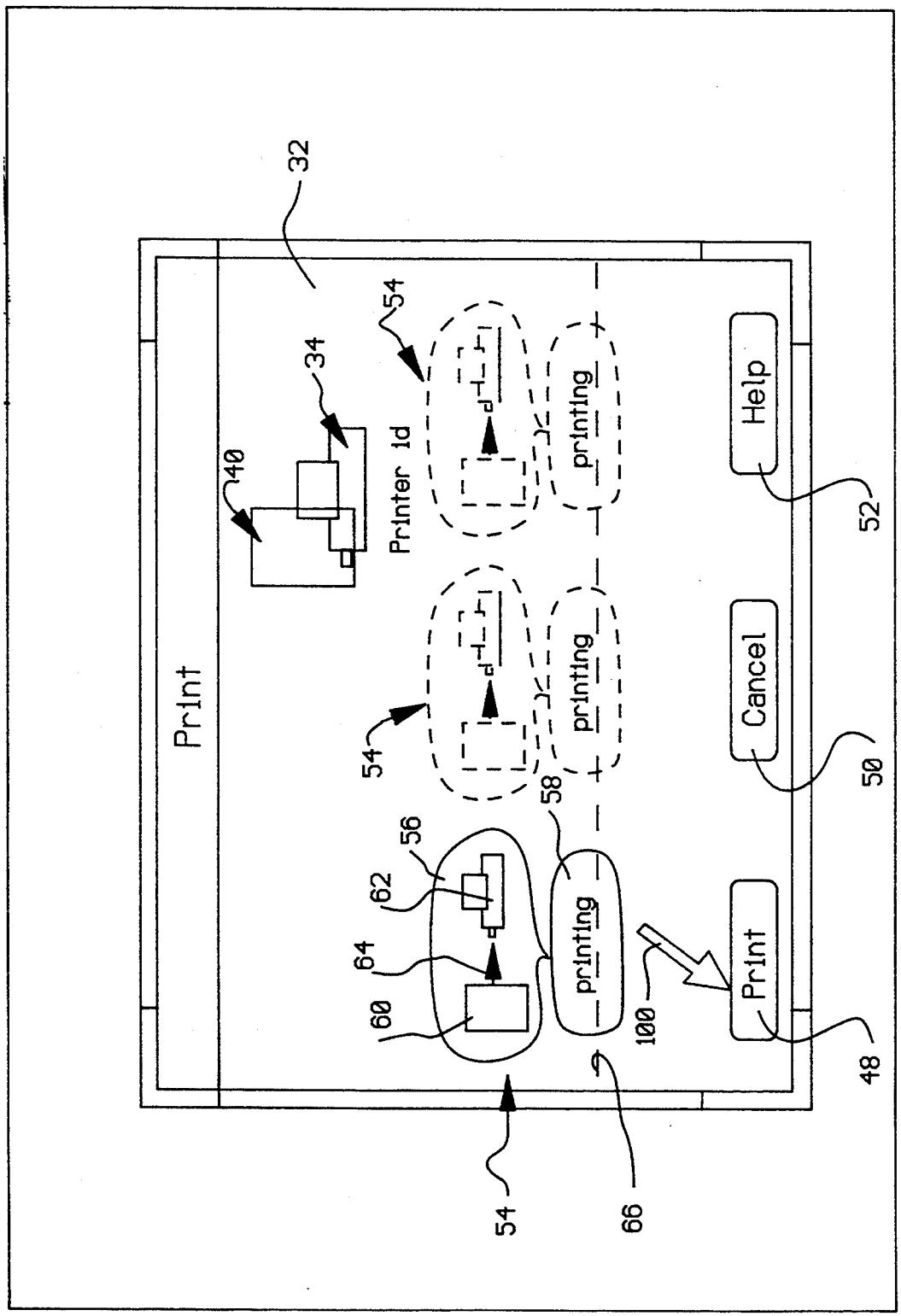
Figure 2C:
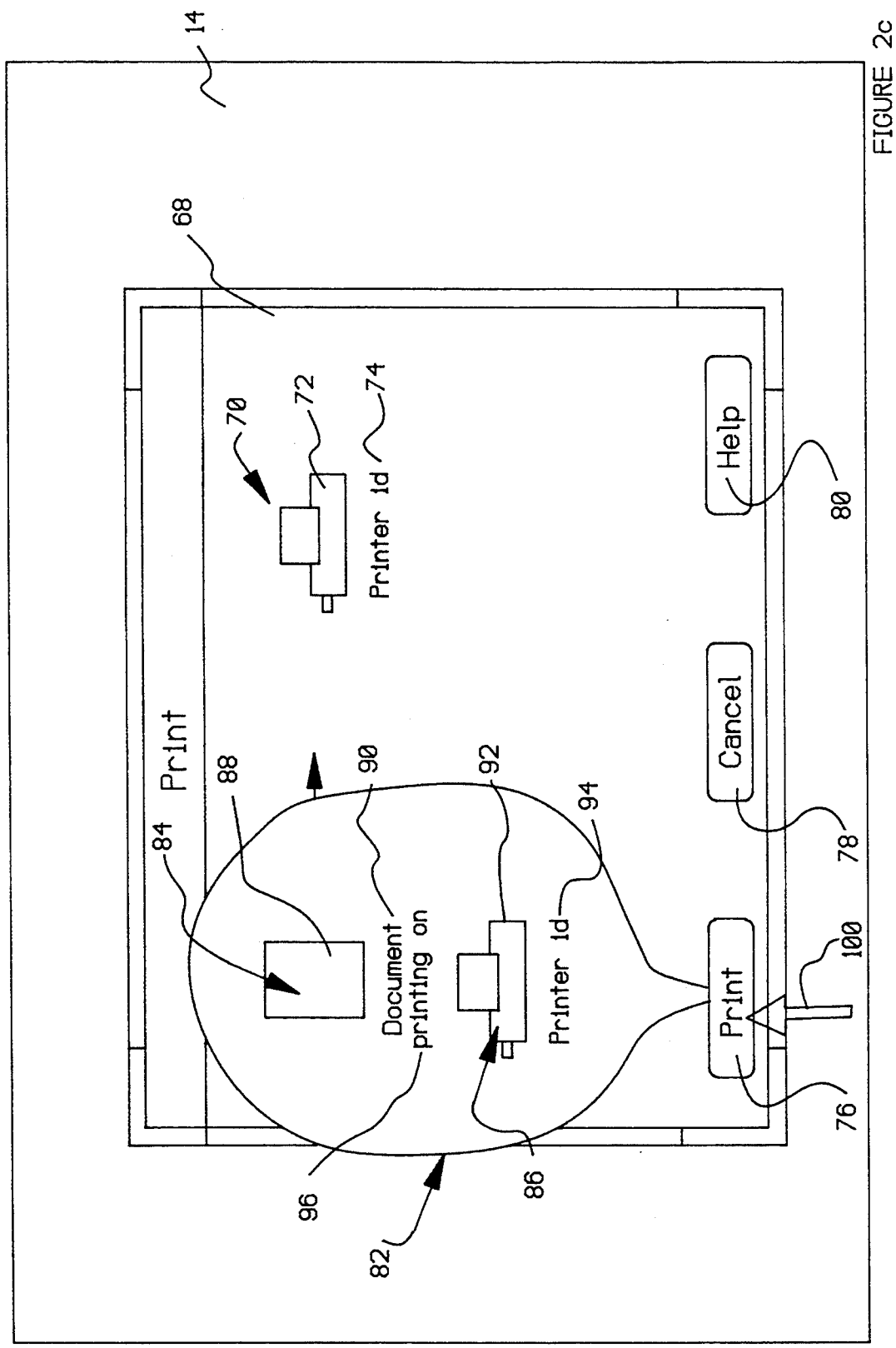
Figure 2D:
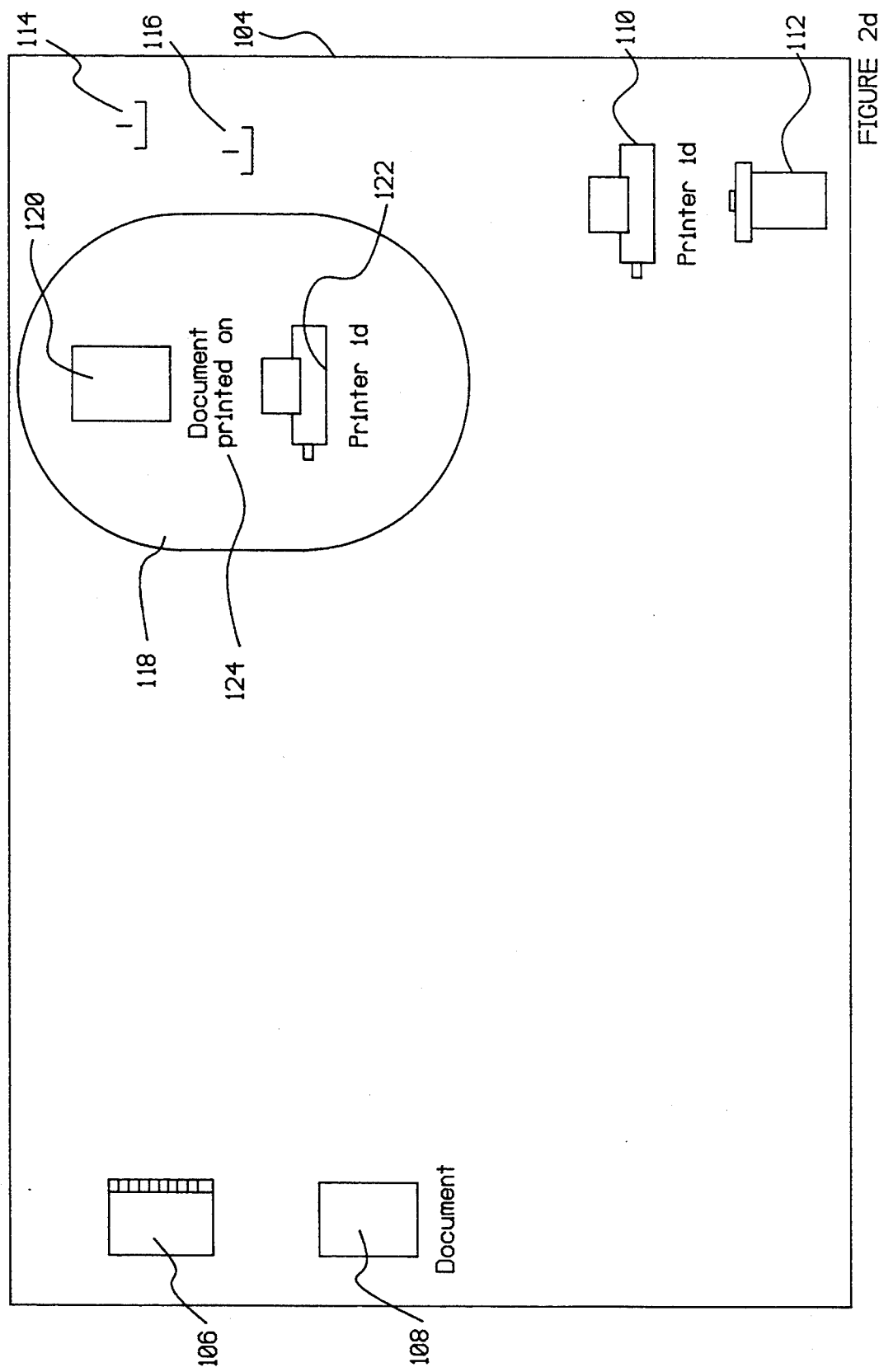
Figure 2E:
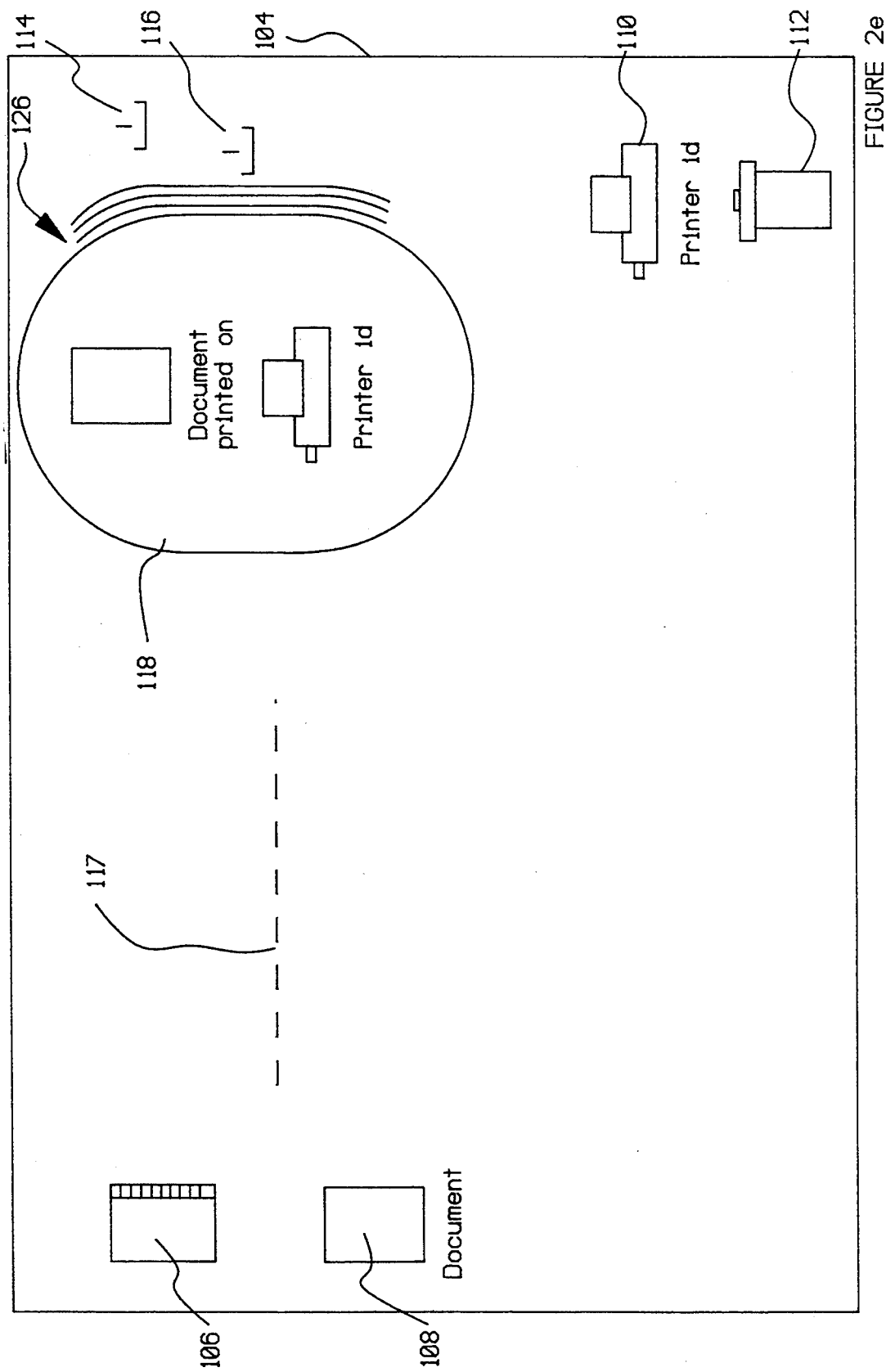

FIGS. 2a through 2e provide examples of utilization of both the action feedback message type and the operation completion message type. FIG. 2a provides an example of one type of screen prior to generation of either the action feedback message or the operation completion message. FIGS. 2b and 2c provide examples of alternative embodiments of the action feedback message system of the present invention. FIGS. 2d and 2e provide examples of the utilization of the operation completion message, and associated queuing protocol, respectively.

With reference first to FIG. 2a, there is depicted workspace 32 which is defined by window 30, which includes iconographic representation 34 of a printer, as well as the iconographic representation 40 of a software object. Iconographic representation 34 of a printer includes non-textual message component 36, and textual message component 38. Preferably, the non-textual message component 36 resembles a printing device, while the textual message component 38 provides some identification of the particular printer represented by the icon. Iconographic representation 40 of a software object also includes non-textual message component 42 as well as a textual message component 44. Preferably, the non-textual message component includes an image which resembles a document, while the textual message component 44 identifies the particular document or document type. In workspace 32, the relationship between iconographic representation 34 of a printer and iconographic representation 40 of a software object is indicated by arrow 46 which represents a drag-and-drop operation. Workspace 32 includes user-actuable graphical user control devices, such as print button 48, cancel button 50, and help button 52. An operator may utilize mouse 20 (and the associated graphical pointing device) to select one or more of these buttons to call predefined data processing functions. The selection of print button 48 will result in printing of the document represented by iconographic representation 40 of a software object on a printer represented by iconographic representation 34 of a printer. Selection of the cancel button 50 will result in suspension or cancellation of any on-going printing operation. Selection of help button 52 will result in the display of textual materials, typically in the form of a pull-down menu, which provides pre-packaged user assistance.

In the preferred embodiment of the present invention, communication between the operator and data processing system 10 is monitored to determine when requests for performance of the particular data processing operations occurs. In the example of FIGS. 2a through 2e, the particular data processing operation which is discussed is that of printing a document on a particular printer. Accordingly, again with reference to FIG. 2a, data processing system 10 monitors the position of graphical pointing device 100 (and/or a cursor, or other indicators of the portion of display 14 which has the operator's attention). When a request for performance of the particular data processing operation is detected, in accordance with the present invention, the action feedback message is automatically displayed on the display in close proximity to the region of the display which is the likely current operator focus of attention. Placement of the action feedback message in a position proximate the latest indication of the operator's point of focus provides the greatest likelihood that the operator will see and understand the action feedback message. In the preferred embodiment of the present invention the action feedback message is displayed only for a predetermined time interval.

Additionally, in the preferred embodiment, the action feedback message is automatically moved across at least a portion of display 14. With reference again to FIG. 2a, display path 66 is indicated by the phantom line, and extends from the left-most boundary of window 30 to the right-most boundary of window 30. Furthermore, as stated above, in the present invention, the action feedback message is initially provided at a location proximate a region on the display which is identified by data processing system 10 as a region of likely operator focus. With reference again to FIG. 2a, graphical pointing device 100 may be utilized to select print button 48, which will cause the document represented by iconographic representation 40 of a software object to be printed on a printer represented by iconographic representation 34 of a printer. Use of graphical pointing device 100 and print button 48 also identifies the current likely region of operator focus. Accordingly, display path 66 is defined, in accordance with a preestablished mapping relationship, with respect to the position of print button 48. The action feedback message is displayed at the left-most region of display path 66 for a fixed (and small) time interval, but will be automatically moved from the left-most portion of display path 66 to the rightmost portion of display path 66 before it is removed from display 14.

FIG. 2b graphically depicts these functions. In this particular embodiment, action feedback message 54 includes a non-textual message component 56 and a textual message component 58. The non-textual message component 56 includes the iconographic representation 60 of a document, as well as the iconographic representation 62 of a printer. Arrow 64 identifies the control flow in a print operation. As was discussed above, action feedback message 54 is automatically moved for the duration of a preestablished time interval from the eft-most portion of window 32 to the rightmost portion of window 32. Phantom representations of action feedback message 54 provide a visual representation of the movement of action feedback message 54 across workspace 32 in a stop-action format, with the phantom representations corresponding to the future locations of the action feedback messages. In the present invention, display path 66 may be defined by the programmer to be confined to a single workspace, such as workspace 32, or to traverse the entire length of display 14 of data processing system 10. The restriction of the movement of action feedback message ,54 to workspace 32 may be most appropriate in an extensively overlapped windows environment, while traversing of the entire display 14 may be appropriate when one or only a few workspaces are designated in display 14. As is also shown in FIG. 2, the print operation may be depicted by a conventional technique, such as the imposition of iconographic representation 40 of a software object upon iconographic representation 34 of a printer. A variety of other conventional visual representations of a data processing operation may be presented concurrently with the presentation of action feedback message 54. Also, in the preferred embodiment of the present invention, action feedback message 54 should be provided within the operator's field of view prior to actual initiation of the particular data processing operation, to allow the operator to cancel (or suspend) the operation through utilization of the cancel button 54 (in this particular example).

An alternative embodiment of the present invention is depicted in FIG. 2c. As shown therein, window 68 is defined within display 14, and includes an iconographic representation 70 of a printer (as well as an iconic representation of a document, which is obscured in the view of FIG. 2c). Iconographic representation 70 of a printer includes a non-textual message component 72 as well as a textual message component 74 (the obscured iconographic representation of a document likewise includes non-textual message components and textual message components). Window 68 further includes print button 76, cancel button 78, and help button 80, which operate in the manner described in connection with FIG. 2a. In this embodiment, action feedback message 82 does not traverse any portion of display 14 or window 68; instead, action feedback message 82 is static in its location relative to both display 14 and window 68. Action feedback message 82 is automatically generated upon detection of the initiation of the particular data processing operation with which it is associated. The action feedback message 82 is maintained on display 14 for a predetermined time interval. It is located proximate the best determination of the region of likely operator focus, as determined from the most recent operator input activities. In the example of FIG. 2c, the particular data processing operation which is represented by action feedback message 82 is that of a print operation. The operator may utilize graphical pointing device 100 to select print button 76 to initiate the print operation. The operator's utilization of graphical pointing device 100 in the region of print button 76 will be utilized to identify the region of the most likely operator focus. Activity feedback message 82 is located with respect to display 14, window 68, and print button 76 in a predefined manner in accordance with a mapping relationship. As stated above, action feedback message 82 will be automatically removed from view in display 14 at the termination of a predetermined time interval. As is shown, action feedback message 82 includes the iconographic representation 84 of a document (including non-textual portion 88 and textual portion 90) as well as the iconographic representation 86 of a printer (which also includes non-textual message component 92 as well as textual message component 94). The words "printing on" define the control flow relationship between the document represented by iconographic representation 84 and the printer represented by iconographic representation 86.

The basic difference between the embodiment of FIGS. 2a and 2b and the embodiment of FIG. 2c is that one version includes the automatic movement of the action feedback message, while the other version defines a static action feedback message. Both action feedback message types are adequate to apprise the operator of the on-going activities of data processing system 10. Both provide the opportunity for the operator to suspend or terminate the requested data processing operation through use of cancel (or suspension) buttons in a graphical user interface.

FIGS. 2d and 2e graphically depict the utilization of the operation completion message. As is shown, window 104 defines a desk-top type workspace which includes iconographic representations of an address book 106, a software document 108, a printing device 110, a trash can 112, and out-box 114, and an in-box 116. As is shown, operation completion message 118 is provided in a selected portion of the workspace defined by window 104. Preferably, operation completion message 118 includes an iconographic representation 120 of the document which has been printed, as well as an iconographic representation 122 of the printer upon which the document has been printed. Both the document and printer are also identified by textual message components. Control relationship identification printing 124 identifies the document as being "printed on" a particular printer.

In the preferred embodiment of the present invention, operation completion message 118 is displayed for a predetermined time interval, and thereafter removed from the workspace defined by window 104. If there has been no communication between the operator and data processing system 10 within a predefined time interval prior to the creation of operation completion message 118, it is assumed that the operator's attention is focused on something other than display 14, and accordingly operation completion message 118 is maintained in the workspace defined by window 104 in display 14 for an indefinite time period until data processing system 10 can determine that the operator has once again returned his or her attention to display 14.

The return of operator focus to a region of display 14 can be identified by (1) keying activity by the operator, or (2) positioning or clicking activity implemented through mouse 20 (or comparable graphical pointing devices). In the preferred embodiment of the present invention, operator completion message 118 is provided in a fixed location relative to the workspace defined by window 104; however, in alternative embodiments, operator completion message 118 may be provided in a region of the workspace defined by window 104 which is proximate the region of likely operator focus, as determined by the previous operator-initiated inputs to data processing system 10 through either keyboard 16 or mouse 20. Prolonged periods of inattention to display 14 by an operator can result in the accumulation of numerous operation completion messages, a situation which is graphically depicted in FIG. 2e. As is shown therein, visual indication 126 is provided adjacent operator completion message 118 to indicate that a plurality of operator completion messages have been stacked, or queued, for eventual successive display to the operator once operator attention has been refocused on display 14. Display path 117 may be provided in a user-selected location for the automatic and successive movement of the operation completion messages across the workspace defined by window 104, once the operator's attention has returned to display 14. (Once again, as determined from monitoring by data processing system 10 of operation interaction with data processing system 10 by utilization of the keyboard or mouse). The operation completion messages may be moved at an operator-selected speed, and displayed for an operator-selected duration, to allow the end-user to define the replay operation to suit individual requirements.

Operator inattention during periods of potential display of action feedback messages can be handled in a similar manner, by stacking, or queuing, the particular action feedback messages in a dedicated memory buffer on a first-end, first-out basis, for eventual presentation to the operator once data processing system 10 can determine that the operator's attention has been refocused on display 14 (again, as indicated by operator-initiated activity at keyboard 16 or mouse 20).

Figure 3:
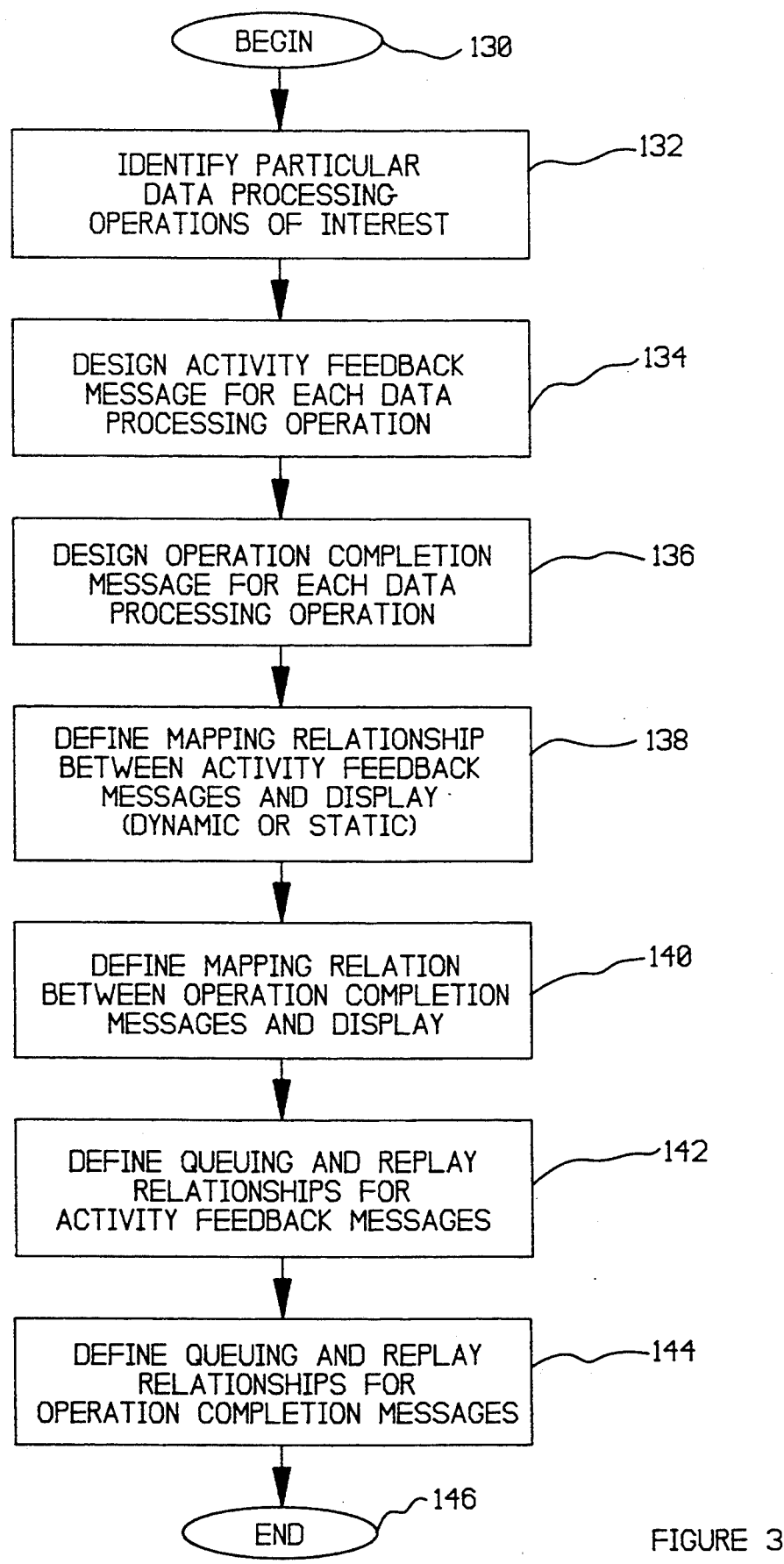
FIG. 3 provides a flowchart representation of the broad method steps which are required to implement the dynamic visual messaging system of the present invention.

The broad technique of implementing the method and apparatus of the present invention will be described now with reference to FIG. 3. The process begins at software block 130, and continues at software block 132, wherein the particular data processing operations which are of interest are identified. Next, in accordance with software block 134, an activity feedback message is designed for each of the identified data processing operations. Then, in accordance with software block 136, an operation completion message is designed for each of the identified data processing operations. In accordance with software block 138, the mapping relationship between the activity feedback message and the video display is defined. Note that this mapping relationship can define a display path which traverses all or a portion of a designated workspace, or can define a static location, depending upon the embodiment which has been selected for representation of the data processing operation. Then, in accordance with software block 140, the mapping relationship between the operation completion messages and the video display is defined. In the preferred embodiment of the present invention, the operation completion messages are static, and maintained at either a predetermined fixed location, or at a location proximate the region of probable operator focus.

Next, in accordance with software block 142, the queuing relationship for activity feedback messages are defined. The queuing and replay relationships may establish that the activity feedback messages are stored, or queued, in a first-in, first-out manner, or in some other manner, such as a first-in, last-out manner. The replay relationship should establish the speed with which the accumulated activity feedback messages are replayed to the operator once operator attention has returned to display 14, as well as the duration of each particular display of an activity feedback message. Then, in accordance with software block 144, the queuing and replay relationships for operation completion messages are defined. The queuing relationship is defined to determine how operation completion messages are stored in memory, and may designate a particular protocol for the entry and exit of operation completion messages from this particular buffer. Furthermore, the replay relationships between the operation completion messages can be defined to determine the speed at which the queued operation completion messages are reviewed during replay, and the duration of display for each particular operation completion message. Finally, the process ends at software block 146.

Figure 4:
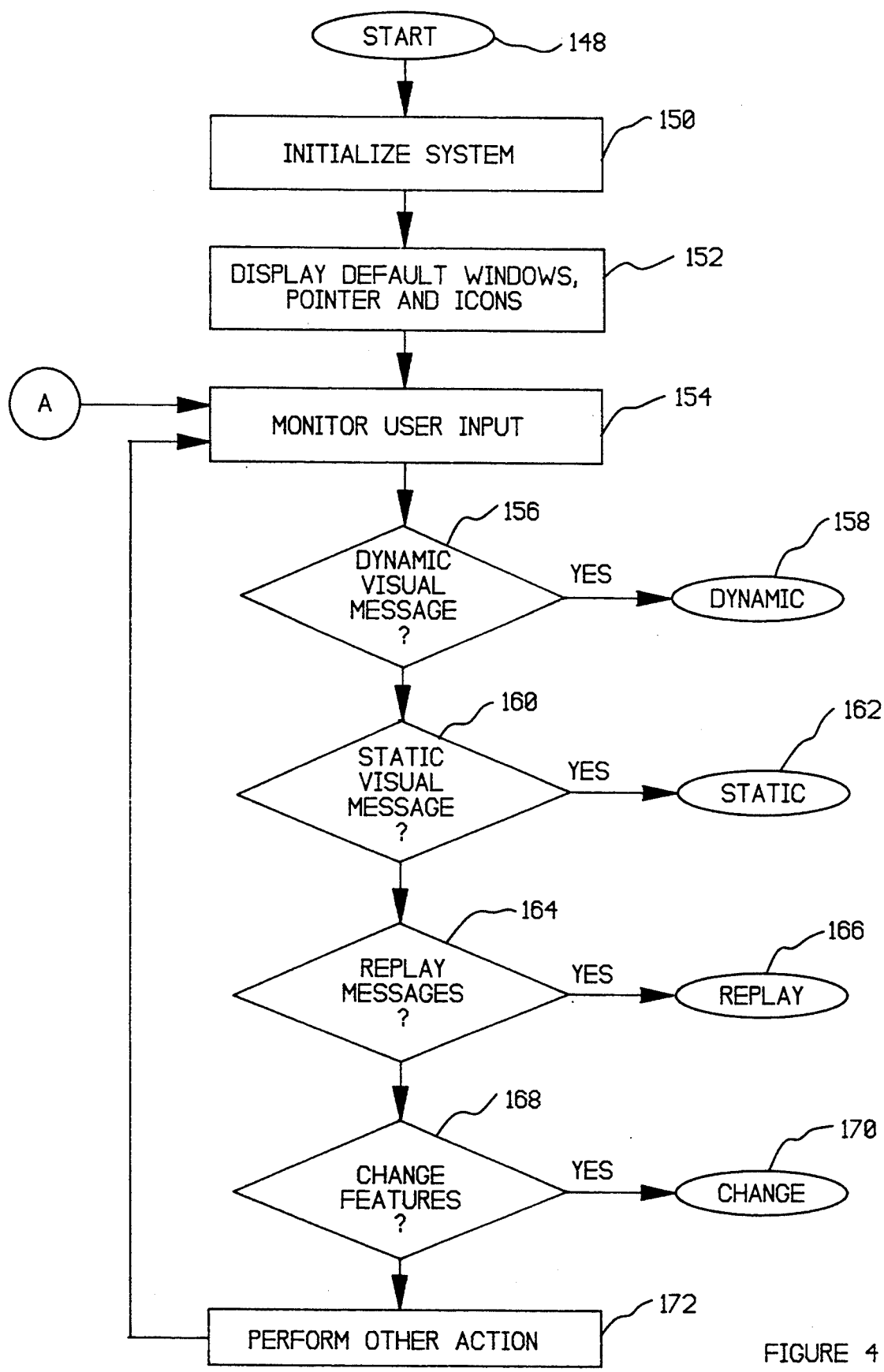
FIG. 4 provides a flowchart representation of a broad overview of the normal operating steps of one preferred embodiment of the visual messaging system of the present invention.

Once the relationships between the action feedback message, the operation completion message, and the particular data processing operations have been established, ordinary operation of the method and apparatus for visually representing data processing operations can commence, as depicted in FIG. 4. The process begins at software block 148, and continues at software block 150 wherein the data processing system 10 is initialized. In accordance with software block 152, data processing system 10 displays default windows, pointers, and icons, in accordance with the operator and/or programmer selections which have previously been made. Next, in accordance with software block 154, user input is monitored. Four broad categories of user input exists, as exemplified by software blocks 156, 160, 164, and 168, including: identifying that a particular user input calls for the performance of a data processing operation which requires the use of a dynamic visual message, as determined in software block 166; a determination that particular user input requires the performance of a particular data processing operation which requires the utilization of a static visual message, including the use of static visual messages for action feedback messages as well as for operation completion messages, as determined by software block 160; a determination that particular user input requires the performance of a particular data processing operation which requires the replay of previously stored action feedback messages or operation completion messages, in accordance with software block 164; a determination that particular operator input calls for the modification of the relationships between particular data processing operations, particular action feedback messages, or particular operation completion messages, as determined in software block 168.

Figure 5:
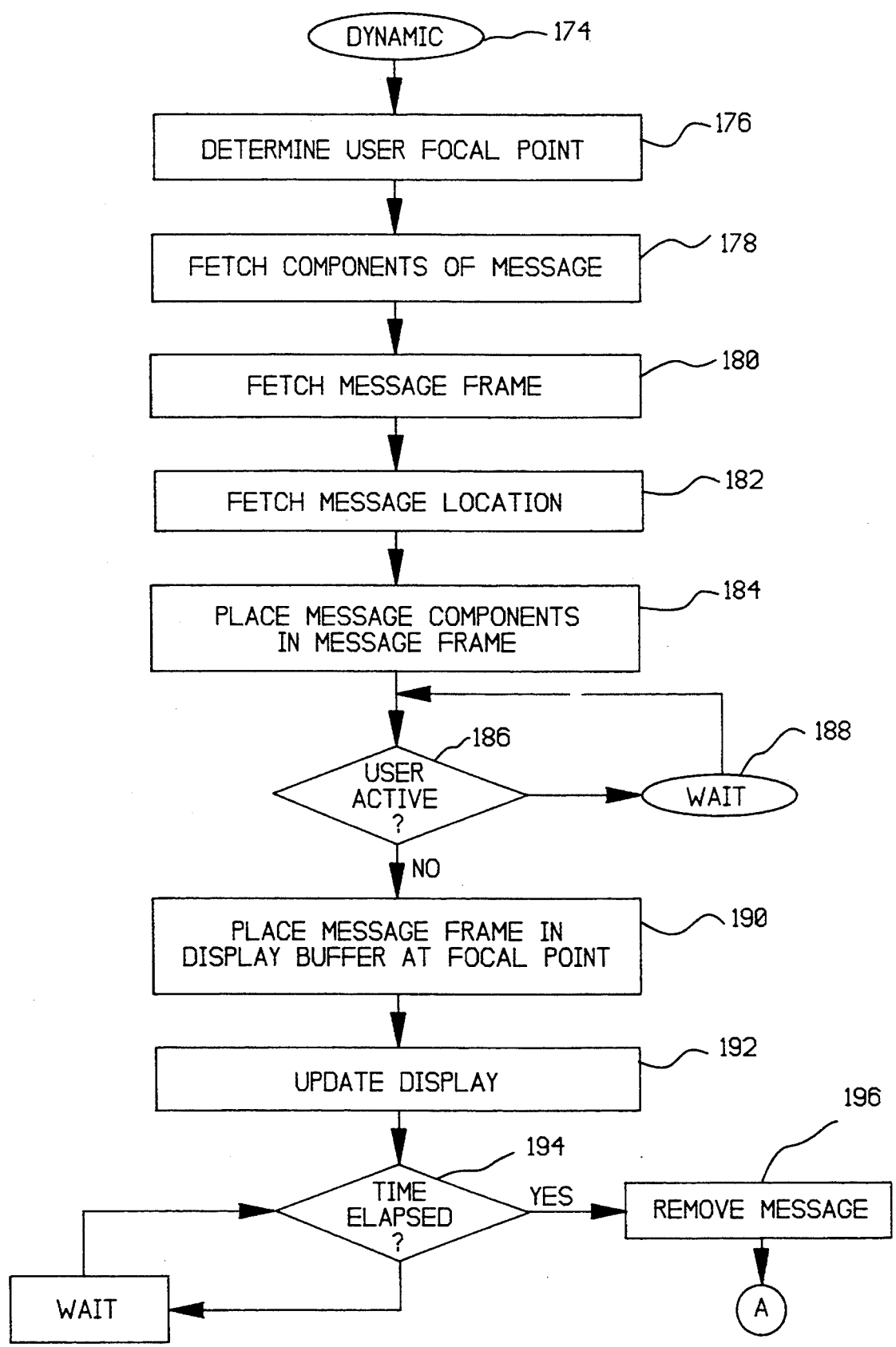
FIGS. 5, 6, 7, and 8 provide detail views of routines identified in the flowchart of FIG. 4, which relate generally (and respectively) to the operation of an action feedback message, the operation of an operation completion message, the operation of a routine for the replay from queuing of operation completion messages, and a routine for receipt of operator input relating to the visual messaging system of the present invention.

If it is determined in software block 156 that data processing system 10 requires the utilization of a dynamic visual message, the process continues at software block 158, which is represented in greater detail in flow-chart form in FIG. 5. If it is determined in software block 160 that data processing operations require the utilization of a static visual message, the process continues at software block 162, which is depicted in greater detail in the flowchart of FIG. 6. If it is determined in software block 164 that a particular data processing operation (namely, the return of operator focus to display 14) requires the replay of previously stored messages, either action feedback messages or operation completion messages the process continues at software block 166, which is depicted in flowchart form and in greater detail in FIG. 7. If it is determined in software block 168 that operator input requires the modification of the existing relationships between particular data processing objects, action feedback messages, or operation completion messages, the process continues at software block 170, which is depicted in flowchart form and in greater detail in FIG. 8. In accordance with software block 172, data processing system 10 performs all other required actions, and returns to software block 154 to monitor for additional operator input.

Turning now to FIG. 5, the technique for utilizing dynamic visual messages is depicted in flowchart form. The process begins at software block 174, and continues in software block 176 by determining the user focal point. As was discussed above, the present user focal point can be determined by reviewing previous operator interactions with data processing system 10, and in particular by reviewing the utilization by operator of keyboard 10, or mouse 20, within a predetermined time window. If a predetermined time interval lapses between the time of inquiry and the last interaction by the operator with data processing system 10, the system assumes that no intelligent determination can be made, and maintains a continual monitoring mode of operation to identify the next operator interaction with data processing system 10 through use of either keyboard 16 or mouse 20. At that time, the operator's focal point can be determined with certitude.

Then, in accordance with software block 178, data processing system 10 fetches the textual and non-textual components of the message from a memory location. Then, in accordance with software block 180, data processing system 10 fetches the message frame, and in accordance with software block 182, fetches the message duration, both from designated memory locations. Then, in accordance with software block 184, data processing system 10 places the message components in a message frame. In software block 186, data processing system determines whether the user is involved in other activities with which the presentation of an action feedback message would interfere. If the user is active in a manner which would result in interference, the process continues at software block 188 by waiting until the operator activity is no longer conflicting. When it is determined, at software block 186, that the user is not active in a manner which would interfere with the presentation of the action feedback message, the process continues at software block 190, wherein the message frame is placed in a display buffer at the previously determined focal point of the operator. Next, in accordance with software block 194, the display buffer is updated, to provide for perceived motion of the action feedback message along a predetermined display path, which is established relative to the probable operator focal point within display 14. Next, in accordance with software block 194, data processing system determines whether the time interval allotted for the visual presentation of the action feedback message has expired; if the time limit has not expired, data processing system 10 waits in accordance with software block 198, and then checks again to determine if the time interval has lapsed. Once software block 194 has determined that the time interval has lapsed, the process continues at software block 196 by removing the visual message from display 14.

Figure 6:
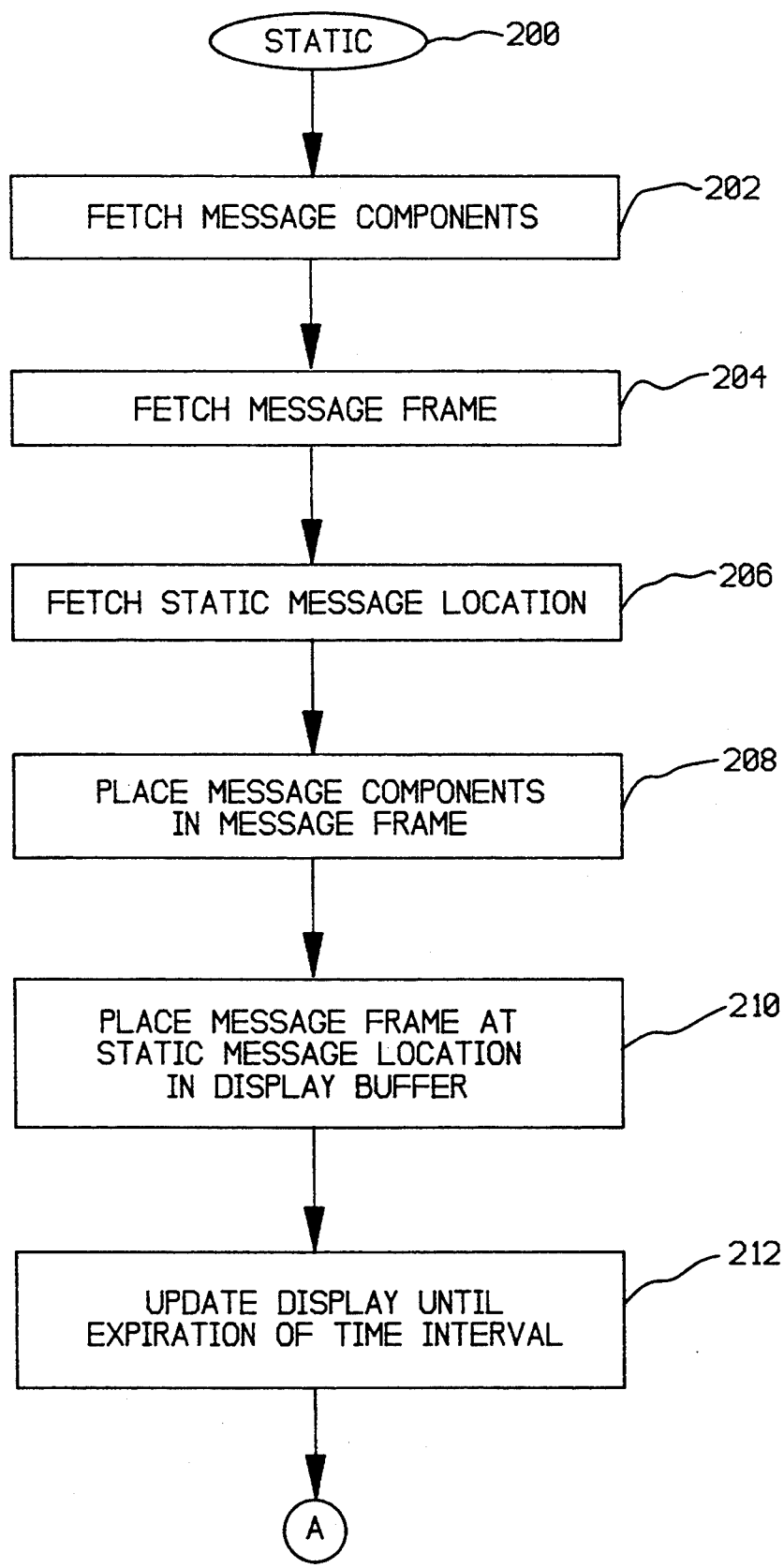

The technique for presenting static messages, such as static action feedback messages and static operation completion messages, is set forth in flowchart form in FIG. 6. The process begins at software block 200, and continues at software block 202, wherein data processing system 10 fetches the appropriate message components which correspond to a particular requested data processing operation. Then, in accordance with software block 204, data processing system 10 fetches the appropriate message frame, and in accordance with software block 206 fetches the static message location. Then, in accordance with software block 208, data processing system 10 places the various message components in the particular message frame. Next, in accordance with software block 210, data processing system 10 places the message frame at a static message location in a display buffer, and in accordance with software block 212 updates the display until the predetermined time interval of presentation identified with the particular static message has lapsed.

Figure 7:
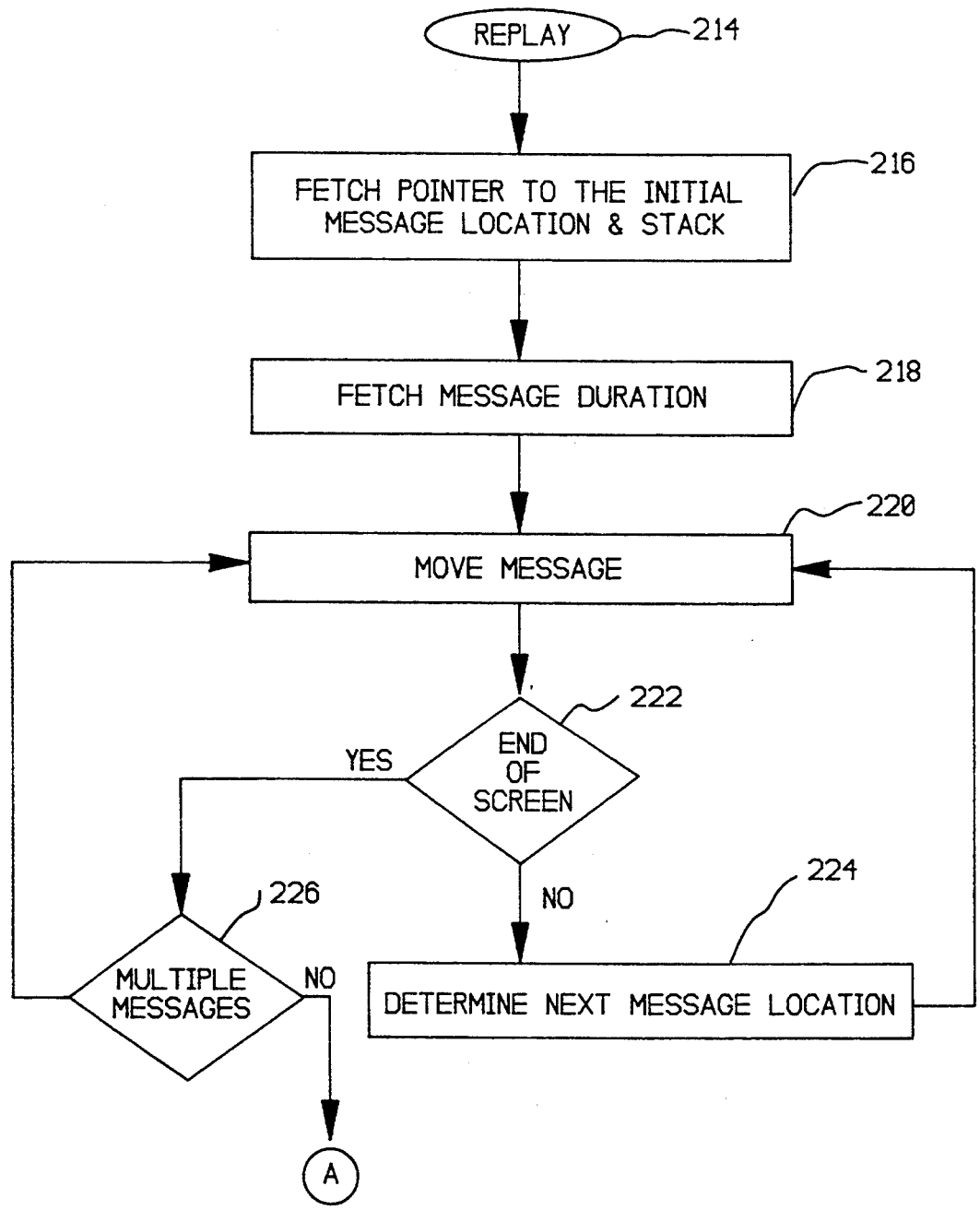

The technique for replaying previously stored action feedback messages is depicted in flowchart form in FIG. 7. The process begins at software block 214, and continues at software block 216 by fetching the pointer to the initial message location on a predetermined display path which is configured to be proximate a region of likely operator focus, as well as the stack of previously stored action feedback messages. Then in accordance with software block 218, data processing system 10 fetches the identification of the message duration for the playback function. As previously stated, it may be useful to provide for a replay duration which is shorter than, or otherwise different from, the time interval designated for display of action feedback messages which occur in "real time", principally due to the fact that a stack of "historical" action feedback messages is inherently less useful to the operator than contemporaneously displayed "real time" action feedback messages. Then, in accordance with software block 220, data processing system 10 moves the first message along the predetermined display path, until it is determined in software block 222 that the end of screen (or other appropriate pre-designated boundary) has been reached by the visually presented action feedback message. If the boundary has not been reached, then in accordance with software block 224, data processing system 10 determines the next location for the particular action feedback message which is being moved automatically across the display path in display 14. Once the action feedback message is moved, the process returns to software block 220 to determine the next appropriate movement of the action feedback message. When it is determined by software blocks 222 that the boundary for the display path has been reached, and no additional messages exist, as determined in software block 226, the process returns to software block 154 of FIG. 4 to monitor operator input.

Figure 8:
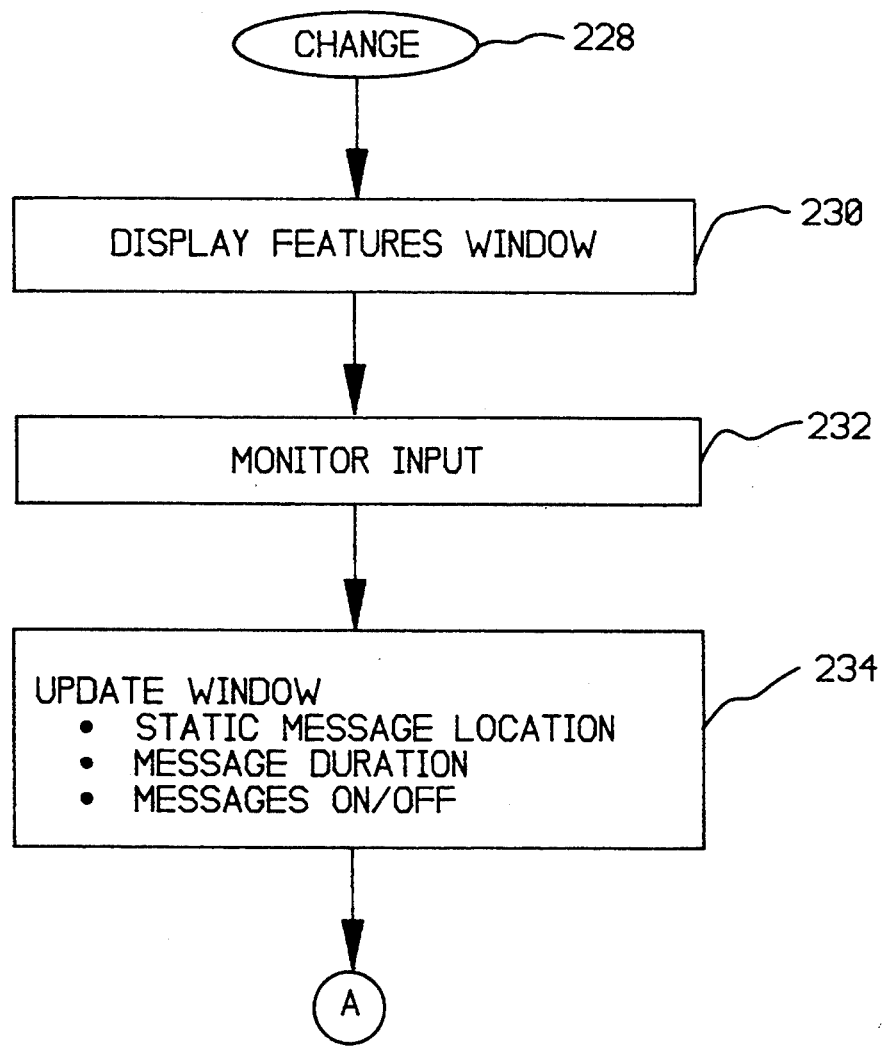

The technique for modifying or overriding certain features of the visual display of messages is set forth in flowchart form in FIG. 8. The process begins at software block 228, and continues at software block 230, wherein a "features" window is displayed for operator selection of variety of options relating to the display of visual messages. In accordance with software block 234, an update window is provided which allows the operator (1) to alter the location of static messages, (2) to alter the duration of particular ones of the visual messages, and (3) to selectively disable the method and apparatus of the present invention of visually representing data processing operations. These features allow a mature and experienced operator to speed up the presentation of visual messages by shortening the duration of presentation on display 14. Additionally, an experienced operator may opt to disregard the significant advantages of the present invention altogether by disabling or suspending the system. These objectives are obtained by conventional manner by providing a plurality of graphical user interface command devices, such as push buttons, which can be selected through use of a control device, such as mouse 20 and/or keyboard 13.

While the invention has been particularly shown and described with reference to a preferred embodiment, it will be understood by those skilled in the art that various changes in form and detail may be made therein without departing from the spirit and scope of the invention.

That which is claimed is:

1. A method in a data processing system of visually representing data processing operations, comprising the method steps of:
   providing an action feedback message, which includes a non-textual graphical message component, for a particular data processing operation;
   monitoring communication between an operator and said data processing system for requests for performance of said particular data processing operation;
   automatically displaying said action feedback message, for a predetermined time interval during performance of said particular data processing operation, on a display of said data processing system each time said particular data processing operation is performed by said data processing system; and
   during said step of automatically displaying said action feedback message, automatically moving said action feedback message along a predetermined display path on said display of said data processing system.

2. A method according to claim 1, further comprising:
   automatically locating said action feedback message in a region of said display of said data processing system of likely operator focus.

3. A method in a data processing system of visually representing data processing, comprising the method steps of:
   providing an action feedback message, which includes a non-textual graphical message component, for a particular data processing operation;
   monitoring communication between an operator and said data processing system for requests for performance of said particular data processing operation;
   automatically displaying said action feedback message, for a predetermined time interval during performance of said particular data processing operation, on a display of said data processing system each time said particular data processing operation is performed by said data processing system;
   automatically determining, from monitored communication between said operator and said data processing system, a region on said display of said data processing system of likely operator focus; and
   automatically locating said action feedback message in said region on said display of likely operator focus.

4. A method according to claim 1, further comprising:
   determining, from monitored communication between said operator and said data processing system, a region on said display of said data processing system of likely operator focus; and
   automatically locating said predetermined display path in a selected position relative to said region on said display of said data processing system of likely operator focus.

5. A method in a data processing system of visually representing data processing operations, comprising the method steps of:
   providing an action feedback message, which includes a non-textual graphical message component, for a particular data processing operation;
   monitoring communication between an operator and said data processing system for requests for performance of said particular data processing operation;
   automatically displaying said action feedback message, for a predetermined time interval during performance of said particular data processing operation, on a display of said data processing system each time said particular data processing operation is performed by said data processing system automatically and continuously determining whether a region of a display of said data processing system of likely operator focus can be identified;
   if said region on said display of said data processing system of likely operator focus can not be identified, delaying said step of automatically displaying said action feedback message until said region of likely operator focus is identified;
   if said region on said display of said data processing system of likely operator focus can be identified:
   (a) determining, from monitored communication between said operator and said data processing system, said region on said display of said data processing system of likely operator focus; and
   (b) automatically locating said action feedback message in said region of said display of said data processing system of likely operator focus.

6. A method according to claim 5, further comprising:
   queuing delayed action feedback messages in a first-in, first-out manner at least until said region of said display of said data processing system of likely operator focus is identified.

7. A method according to claim 1, further comprising:
   automatically and continuously determining whether a region of said display of said data processing system of likely operator focus can be identified;
   if said region on said display of said data processing system of likely operator focus can not be identified, delaying said step of automatically displaying said action feedback message until it is possible to determine said region of likely operator focus;
   if said region on said display of said data processing system of likely operator focus can be identified:
   a) determining, from monitored communication between said operator and said data processing system, said region on said display of said data processing system of likely operator focus; and
   (b) automatically locating said predetermine...d display path proximate said region on said display or said data processing system of likely operator focus.

8. A method according to claim 7, further comprising:

queuing delayed action feedback messages in a first-in, first-out manner at least until said region of likely operator focus is identified.

9. A method according to claim 1:
wherein said action feedback message includes (a) a non-textual graphical message component, and (b) a textual message component.

10. A method according to claim 1:
wherein said non-textual graphical message component of said action feedback message provides an indication of (a) the particular data processing operation, and (b) control flow of said particular data processing operation.

11. A method according to claim 1, further comprising:
initiating said step of automatically displaying prior to initiation of said particular data processing operation;
providing at least one graphical user interface button to allow at least one of (a) suspension and (b) abortion of said particular data processing operation during at least one of (a) prior to initiation and (b) during execution; and
monitoring operator input to detect activation of said at least one graphical user interface button.

12. A method in a data processing system of visually representing data processing operations, comprising the method steps of:
providing an action feedback message, which includes a non-textual graphical message component, for a particular data processing operation;
monitoring communication between an operator and said data processing system for requests for performance of said particular data processing operation;
automatically displaying said action feedback message, for a predetermined time interval during performance of said particular data processing operation, on a display of said data processing system each time said particular data processing operation is performed by said data processing system;
providing an operation completion message, which includes a non-textual graphical message component, and which differs from said action feedback message, for said particular data processing operation;
monitoring for completion of said particular data processing operation;
if operator activity is detected, automatically displaying said operation completion message on said display of said data processing system for a predetermined time interval after completion of said particular data processing operation,
if no operator activity is detected, automatically displaying said operation completion message on said display of said data processing system for an indefinite time period until operator activity is detected.

13. A method according to claim 12:
wherein said operation completion message includes (a) a non-textual graphical message component and (b) a textual message component.

14. A method according to claim 1, further comprising:
providing at least one graphical user interface command which allows disabling of at least said step of automatically displaying said action feedback message; and
disabling of at least said step of automatically displaying said action feedback message, in response to activation of said at least one graphical user interface command.

15. A method in a data processing system of visually representing data processing operations, comprising the method steps of:
providing an action feedback message, which includes a non-textual graphical message component, for a particular data processing operation;
monitoring communication between an operator and said data processing system for requests for performance of said particular data processing operation;
automatically displaying said action feedback message, for a predetermined time interval during performance of said particular data processing operation, on a display of said data processing system each time said particular data processing operation is performed by said data processing system;
providing at least one graphical user interface command which allows operator setting of said predetermined time interval for automatic display of said action feedback message; and
establishing said predetermined time interval for display of said action feedback message in response to operator input through said at least one graphical user interface command.

16. A method according to claim 1:
wherein said predetermined display path is at least in part defined by boundaries of a designated workspace.

17. A method according to claim 1:
wherein said predetermined display path is defined at least in part by boundaries of said display.

18. A method in a data processing system of visually representing a plurality of data processing operations, comprising the method steps of:
providing a plurality of action feedback messages, each of which includes a non-textual graphical message component, each for a particular data processing operation;
monitoring communication between an operator and said data processing system for requests for performance of any of said data processing operations for which an action feedback message exists;
automatically displaying an associated action feedback message, for a predetermined time interval during performance of any particular one of said plurality of data processing operations, on a display of said data processing system, each time any of said plurality of data processing operations is performed by said data processing system; and
automatically moving each associated action feedback message along a predetermined display path on said display of said data processing system during said step of automatically displaying.

19. A method according to claim 18, further comprising:
determining, from monitored communication between said operator and said data processing system, a region on said display of said data processing system of likely operator focus; and
automatically locating said predetermined display path in a selected position relative to said region on said display of said data processing system of likely operator focus.

20. A method according to claim 18, further comprising: automatically and continuously determining whether a region of a display of said data processing system of likely operator focus can be identified;

if said region on said display of said data processing system of likely operator focus can not be identified, delaying said step of automatically displaying said action feedback message until said region of likely operator focus can be identified;

if said region on said display of likely operator focus can be identified:

(a) determining, from monitored communication between said operator and said data processing system, said region on said display of said data processing system of likely operator focus; and (b) automatically locating said predetermined display path in a selected position relative to said region on said display of said data processing system of likely operator focus.

21. A method according to claim 18, further comprising:

initiating said step of automatically displaying prior to initiation of any particular data processing operation;

providing at least one graphical user interface button to allow at least one of (a) suspension, and (b) abortion of said particular data processing operation during at least one of (a) prior to initiation and (b) during execution; and monitoring operator input to detect activation of said at least one graphical user interface button.

22. A method in a data processing system of visually representing data processing operations, comprising the method steps of:

providing a plurality of action feedback messages, each of which includes a non-textual graphical message component, each for a particular data processing operation;

monitoring communication between an operator and said data processing system for requests for performance of any of said data processing operations for which an action feed back message exists;

automatically displaying an associated action feedback message, for a predetermined time interval during performance of any particular one of said plurality of data processing operations, on a display of said data processing system, each time any of said plurality of data processing operations is performed by said data processing system;

automatically moving each associated action feedback message along a predetermined display path on said display of said data processing system during said step of automatically displaying;

providing an operation completion message, which includes a non-textual graphical message component, and which differs from said action feedback message, for each of said plurality of data processing operations;

monitoring for completion of any of said plurality of data processing operations;

automatically displaying an associated operation completion message on said display of said data processing system for a predetermined time interval after completion of any of said plurality of particular data processing operations.

23. A method according to claim 22, further comprising: automatically queuing said associated operation completion messages during periods of determined operator inattention, for later replay.

24. A method according to claim 22, further comprising:

automatically queuing said action feedback messages during periods of determined operator inattention, for later replay.

25. A means in a data processing system for visually representing data processing operations, comprising:

icons means for providing an action feedback message which includes a non-textual graphical message component, for a particular data processing operation;

means for monitoring communication between an operator and said data processing system for requests for performance of said particular data processing operation; and display means for automatically displaying said action feedback message, for a predetermined time interval during execution of said particular data processing operation, on a display of said data processing system each time said particular data processing operation is performed by said data processing system;

focus locator means for determining from monitored communication between said operator and said data processing system a region on said display of said data processing system of likely operator focus; and display locator means for automatically locating a display path in a selected position relative to said region on said display of said data processing system of likely operator focus.

26. A means in a data processing system for visually representing data processing operations, comprising:

icons means for providing an action feedback message which includes a non-textual graphical message component, for a particular data processing operation;

means for monitoring communication between an operator and said data processing system for requests for performance of said particular data processing operation;

display means for automatically displaying said action feedback message, for a predetermined time interval during execution of said particular data processing operation, on a display of said data processing system each time said particular data processing operation is performed by said data processing system;

focus locator means for automatically and continuously determining whether a region of aid display of said data processing system a display of likely operator focus can be identified;

display delay means for delaying said step of automatically displaying said action feedback message until said region of said display of said data processing system likely operator focus can be identified; and (a) determining, from monitored communication between said operator and said data processing system, said region on said display of said data processing system of likely operator focus; and (b) automatically locating said display path proximate to said region on said display of likely operator focus.

27. A means according to claim 29, further comprising:

queuing means for queuing delayed action feedback messages in a first-in, first-out manner at least until said region of said display of said data processing system likely operator focus can be identified.

28. A means in a data processing system for visually representing data processing operations, comprising:

icons means for providing an action feedback message which includes a non-textual graphical message component, for a particular data processing operation;

means for monitoring communication between an operator and said data processing system for requests for performance of said particular data processing operation;

display means for automatically displaying said action feedback message, for a predetermined time interval during execution of said particular data processing operation, on a display of said data processing system each time said particular data processing operation is performed by said data processing system;

completion identification means for providing an operation completion message, which includes a non-textual graphical message component, and which differs from said action feedback message, for said particular data processing operation which is automatically displayed on said display of said data processing system for a predetermined time interval after completion of said particular data processing operation if operator activity is detected, but if no operator activity is detected, displaying of said operation completion message indefinitely until operator activity is detected.

* * * * *

UNITED STATES PATENT AND TRADEMARK OFFICE
CERTIFICATE OF CORRECTION

PATENT NO. : 5,448,695
DATED : September 5, 1995
INVENTOR(S) : Douglas et al.

It is certified that error appears in the above-indentified patent and that said Letters Patent is hereby corrected as shown below:

Column 14, line 63: change "predetermine...d" to --predetermined--

Column 14, line 65: change "or" to --of--

Column 15, lines 33-34: delete hard return so the line beginning "processing system . . ." follows the words "said data"

Signed and Sealed this

Twenty-seventh Day of August, 1996

Attest:

BRUCE LEHMAN

*Attesting Officer*   *Commissioner of Patents and Trademarks*